(12) United States Patent
Baek et al.

(10) Patent No.: US 8,139,484 B2
(45) Date of Patent: Mar. 20, 2012

(54) UNSOLICITED GRANT SERVICE CLASS OF IEEE 802.16/WIBRO SYSTEM

(75) Inventors: Joo-Young Baek, Pohang (KR);
Min-Kon Kwak, Seongnam (KR);
Dong-Hee Kwon, Seongnam (KR);
Young Joo Suh, Pohang (KR)

(73) Assignees: Postech Academy-Industry Foundation, Kyungsangbuk-do (KR); Posco, Gyeongsangbuk-do (KR)

( * ) Notice: Subject to any disclaimer, the term of this patent is extended or adjusted under 35 U.S.C. 154(b) by 767 days.

(21) Appl. No.: 12/200,461

(22) Filed: Aug. 28, 2008

(65) Prior Publication Data

US 2009/0059847 A1  Mar. 5, 2009

(30) Foreign Application Priority Data

Aug. 29, 2007  (KR) .................. 10-2007-0087277

(51) Int. Cl.
*H04W 4/00* (2009.01)
(52) U.S. Cl. ............... 370/230.1; 370/235; 370/310; 370/328
(58) Field of Classification Search ................ None
See application file for complete search history.

(56) References Cited

U.S. PATENT DOCUMENTS

| | | | |
|---|---|---|---|
| 2008/0062877 A1* | 3/2008 | Chen .................. | 370/235 |
| 2009/0059847 A1* | 3/2009 | Baek et al. ............ | 370/328 |
| 2010/0046444 A1* | 2/2010 | Lin et al. .............. | 370/329 |

OTHER PUBLICATIONS

Partial European Search Report dated Dec. 13, 2011.
Sarat Chandra et al: "An Efficient Call Admission Control for IEEE 802.16 Networks", Local&Metropolitan Area Networks, 2007. Lanman 2007. 15TH IEEE Workshop on, IEEE,PI, Jun. 1, 2007 (Jun. 1, 2007), pp. 188-193, XP031130432.
Hawa M et al: "Quality of Service Scheduling in Cable and Broadband Wireless Access Systems", IEEE 2002 Tenth IEEE International Workshop on Quality of Service (Cat. No. 02EX564) IEEE Piscataway, NJ, USA, May 17, 202 (May 17, 2002), pp. 247-255, XP002530394.
Claudio Cicconetti et al: "Quality of Service Support in IEEE 802.16 Networks", IEEE Network, IEEE Service Center, New York, NY, US, Apr. 1, 2006, pp. 50-55, XP002457916.

* cited by examiner

*Primary Examiner* — Chirag Shah
*Assistant Examiner* — Salvador E Rivas
(74) *Attorney, Agent, or Firm* — Perman & Green, LLP

(57) ABSTRACT

Provided is a traffic class of an IEEE 802.16/WiBro system. The unsolicited grant service (UGS) scheduling method with regard to a subscriber station (SS) and a base station (BS) that are disposed in a network wherein an IEEE 802.16/WiBro system is realized, the method includes: when the SS requires 1 through M (where M is a positive integer) UGS flows, and the BS serves 1 through N (where N is a positive integer) frames, the BS storing grant periods and guaranteed sizes that are granted to the M UGS flows in each N frame; and the BS comparing service capacity of a frame and a sum of guaranteed sizes of each flow belonging to the N frames, and determining if an overload occurs.

11 Claims, 6 Drawing Sheets

| FLOW \ FRAME | 1 | 2 | 3 | 4 | 5 | 6 | 7 | 8 | 9 | 10 | 11 | 12 | ... | N |
|---|---|---|---|---|---|---|---|---|---|---|---|---|---|---|
| 1 | | 50 | | 50 | | 50 | | 50 | | 50 | | 50 | | 50 |
| 2 | | | 100 | | | 100 | | | 100 | | | 100 | | |
| 3 | | | | | | | | | | | | | | |
| 4 | 10 | | | 10 | | | | 10 | | | | 10 | | |
| 5 | | | | | | | | | | | | | | |
| 6 | | 5 | | | 5 | | | 5 | | | 5 | | | |
| 7 | | | 80 | | | 80 | | | 80 | | | 80 | | |
| 8 | | 40 | | | | 40 | | | | | | 40 | | |
| 9 | | | | 90 | | | | | 90 | | | 90 | | |
| ... | | | | | | | | | | | | | | |
| SUM=M | 10 | 95 | 180 | 150 | 5 | 230 | 40 | 155 | 180 | 50 | 5 | 370 | | |

UNSOLICITED GRANT SERVICE CLASS OF IEEE 802.16/WIBRO SYSTEM

CROSS-REFERENCE TO RELATED PATENT APPLICATION

This application claims the benefit of Korean Patent Application No. 10-2007-0087277, filed on Aug. 29, 2007, in the Korean Intellectual Property Office, the disclosure of which is incorporated herein in its entirety by reference.

BACKGROUND OF THE INVENTION

1. Field of the Invention

The present invention relates to a traffic class of an IEEE 802.16/WiBro system, and more particularly, to an unsolicited grant service (UGS) class.

2. Description of the Related Art

An IEEE 802.16 protocol has a physical layer and a medium access control (MAC) layer for a new wireless broadband network.

An IEEE 802.16/WiBro network includes a base station (BS), a subscriber station (SS), an access router (AR), and the like. The IEEE 802.16 protocol is applied between the BS and SS.

FIG. 1 illustrates a structure of a conventional IEEE 802.16/WiBro network. Referring to FIG. 1, the IEEE 802.16/WiBro network comprises an SS 101 that is a user terminal supporting an IEEE 802.16 protocol, a BS 102 that controls and manages a connection with the SS 101, and an AR 103 that transmits traffic received through the BS 102 to an Internet backbone network.

The IEEE 802.16/WiBro network basically provides a variety of quality of services (QoS). A variety of QoS parameters, such as bandwidth, change according to services provided by an application layer of the SS 101. Unlike in a wired network, in the IEEE 802.16/WiBro network, the characteristics of a physical medium, such as a data transmission rate, may rapidly change according to the characteristics and environment of a wireless medium.

In the IEEE 802.16/WiBro network, the SS 101 defines a service class in order to guarantee the QoS. In more detail, the SS 101 defines the service class, such as an unsolicited grant service (UGS) class, an enhanced-real-time polling service (ertPS) class, a real-time polling service (rtPS) class, a non-real-time polling service (nrtPS) class, and a best effort service (BE) class, and defines scheduling according to the service class.

The UGS class provides a real-time data transmission service having a fixed size and a periodic interval. The UGS class supports a real-time uplink service that periodically transmits data having a fixed size, such as T1/E1, and voice over Internet protocol (VoIP) traffic having no silence suppression.

The rtPS class provides real-time bandwidth request and polling, and variable data scheduling and includes video calls, video games, video on demand (VOD), etc. The rtPS class supports a real-time uplink service that periodically transmits data having a variable size, such as MPEG video traffic. RtPS scheduling must satisfy the characteristics of real-time traffic, and support a method of notifying the BS 102 of a bandwidth required by the SS 101. In order to satisfy the above requirements, the BS 102 performs periodic polling with regard to a specific SS. The specific SS on which the polling is performed requests a bandwidth according to an amount required by the specific SS. Hence, although data transmission efficiency between the SS 101 and the BS 102 is optimized, since the bandwidth is expressly requested, the rtPS class has an overhead compared to the UGS class.

The ertPS class provides a real-time data transmission service having a fixed size and a periodic interval, such as a VoIP service. But, there is a silence period of this class application. Thus, SS 101 requires the change in the bandwidth and accordingly manages a bandwidth QoS to BS 102.

The nrtPS class provides a service sensitive to minimum data processing rate compensation and packet loss and includes large volume FTP, multimedia emails, etc. The nrtPS class supports a data stream having a variable size that is insensitive to latency, such as FTP. A scheduling mechanism of the nrtPS class supports bandwidth allocation by polling and by competition.

The BE class provides a fair scheduling and efficient data retransmission service and includes a web browsing email service, a short message transmission service, low speed file transmission, etc. The BE class supports a method of piggybacking a bandwidth request for periodic polling and data transmission, and a method of requesting bandwidth by competition.

The present invention relates to the UGS class. The 802.16 system initializes the UGS service by communicating a message such as DSA-REQ/DSA-RSP between the SS 101 and the BS 102. In particular, the present invention concerns UGS parameters applied by the BS 102 to the SS 101. The UGS parameters include a grant interval, a guaranteed size, etc. The present invention mainly concerns the grant interval.

FIG. 2 is a diagram for explaining an overload exceeding service capacity of the BS 102.

Referring to FIG. 2, the BS 102 provides a service to each of frames 1 through 10. Each frame has a period d and a capacity R. Each of flows 0 through 5 is a unit of a data transmission service such as the UTS class, rtPS class, etc. required by the SS 101. The flows 0, 2, 3, and 4 are UGS flows. The flows 1 and 5 are rtPS flows.

The BS 102 faces an overload where the capacity R is exceeded in the frames 6 and 10. The reason for this will now be described.

The BS 102 first admits a flow according to whether the flow provides a service within the capacity range of the BS 102 at a corresponding point of time.

However, a problem occurs when grant intervals of the UGS flows 0, 2, 3, and 4 meet one another. In detail, an overload may occur where the capacity range required to serve the UGS flows by the BS 102 is exceeded in a frame at a least common multiple (LCM) of grant intervals.

For example, the flow 2 has a grant interval of 4 and thus the BS 102 provides the service every 4 interval frames. The flow 2 receives the service in the frames 2, 6, and 10. The flow 3 has a grant interval of 2 and thus receives the service in the frames 2, 4, 6, 8, and 10. Since the flows 2 and 3 have the grant interval of 2 and 4, respectively, the LCM is 4 so that the overload occurs in the frame 6 and 10.

The overload is subject to the number of flows belonging to the UGS class, making it impossible to provide the QoS in the BS 102.

SUMMARY OF THE INVENTION

The present invention provides an unsolicited grant service (UGS) scheduling method and system realized in an IEEE 802.16/WiBro system capable of resolving an UGS overload, and, in particular, a method and system for providing a service based on grant intervals of UGS flows.

According to an aspect of the present invention, there is provided an unsolicited grant service (UGS) scheduling method with regard to a subscriber station (SS) and a base station (BS) that are disposed in a network wherein an IEEE 802.16/WiBro system is realized, the method comprising: when the SS requires 1 through M (where M is a positive integer) UGS flows, and the BS serves 1 through N (where N is a positive integer) frames, the BS storing grant periods and guaranteed sizes that are granted to the M UGS flows in each N frame; and the BS comparing service capacity of a frame and a sum of guaranteed sizes of each flow belonging to the N frames, and determining if an overload occurs.

The method may further comprise: after the comparing, a new flow of the SS transmitting a DSA-REQ message to the BS.

The method may further comprise: after the comparing, excluding a frame where the overload occurs from a group of service frames.

The method may further comprise: calculating a least common multiple (LCM) period between the new flow of the SS and other flows belonging to a frame at a time the DSA-REQ message arrives at the BS, with regard to frames that are not excluded.

The method may further comprise: if the calculated LCM period is a prime, selecting the calculated LCM period as a grant period of the new flow.

The method may further comprise: if the calculated LCM period is not a prime, selecting a value for minimizing the LCM as the grant period of the new flow.

The method may further comprise: the BS transmitting the selected grant period to the SS via a DSA-RSP message.

The method may further comprise: when the overload occurs, dividing flows belonging to a corresponding frame into a regular group that is served without any influence of a service interval of other flows but is served at a regular grant interval and an L-delay group (where L is a positive integral) that is served due to a delay of an L frame.

The method may further comprise: after the dividing of flows, calculating parameters comprising weights of delay (WD) that indicate the degree of a service delay with regard to the regular group and the L-delay group.

The method may further comprise: after the calculating of the parameters WD, calculating an LCM period of flows belonging to the frame where the overload occurs, updating the parameters WD for each frame corresponding to the LCM period, and changing a service order.

According to another aspect of the present invention, there is provided a UGS scheduling system realized in an IEEE 802.16/WiBro system comprising: an SS located in a network wherein the IEEE 802.16/WiBro system is realized; and a BS located in the network where the IEEE 802.16/WiBro system is realized; and wherein the BS comprises an overload determining unit, when the SS requires 1 through M (where M is a positive integer) UGS flows, and the BS serves 1 through N (where N is a positive integer) frames, storing grant periods and guaranteed size that are granted to the M UGS flows in each N frame, and comparing service capacity of a frame and a sum of guaranteed sizes of each flow belonging to the N frames, and determining if an overload occurs.

The BS may comprise a period calculating unit, if a new flow of the SS transmits a DSA-REQ message to the BS, excluding a frame where the overload occurs from a group of service frames, and calculating an LCM period between the new flow of the SS and other flows belonging to a frame at a time the DSA-REQ message arrives at the BS, with regard to frames that are not excluded.

The BS may comprise a period selecting unit, if the calculated LCM period is a prime, selecting the calculated LCM period as a grant period of the new flow, and if the calculated LCM period is not a prime, selecting a value for minimizing the LCM The BS may comprise a group dividing unit, when the overload occurs, dividing flows belonging to a corresponding frame into a regular group that is served without any influence of a service interval of other flows but is served at a regular grant interval and an L-delay group (where L is a positive integral) that is served due to a delay of an L frame.

The BS may comprise: a delay calculating unit calculating parameters WD that indicate the degree of a service delay with regard to the regular group and the L-delay group; and a service order changing unit calculating an LCM period of flows belonging to the frame where the overload occurs, updating the parameters WD for each frame corresponding to the LCM period, and changing a service order.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
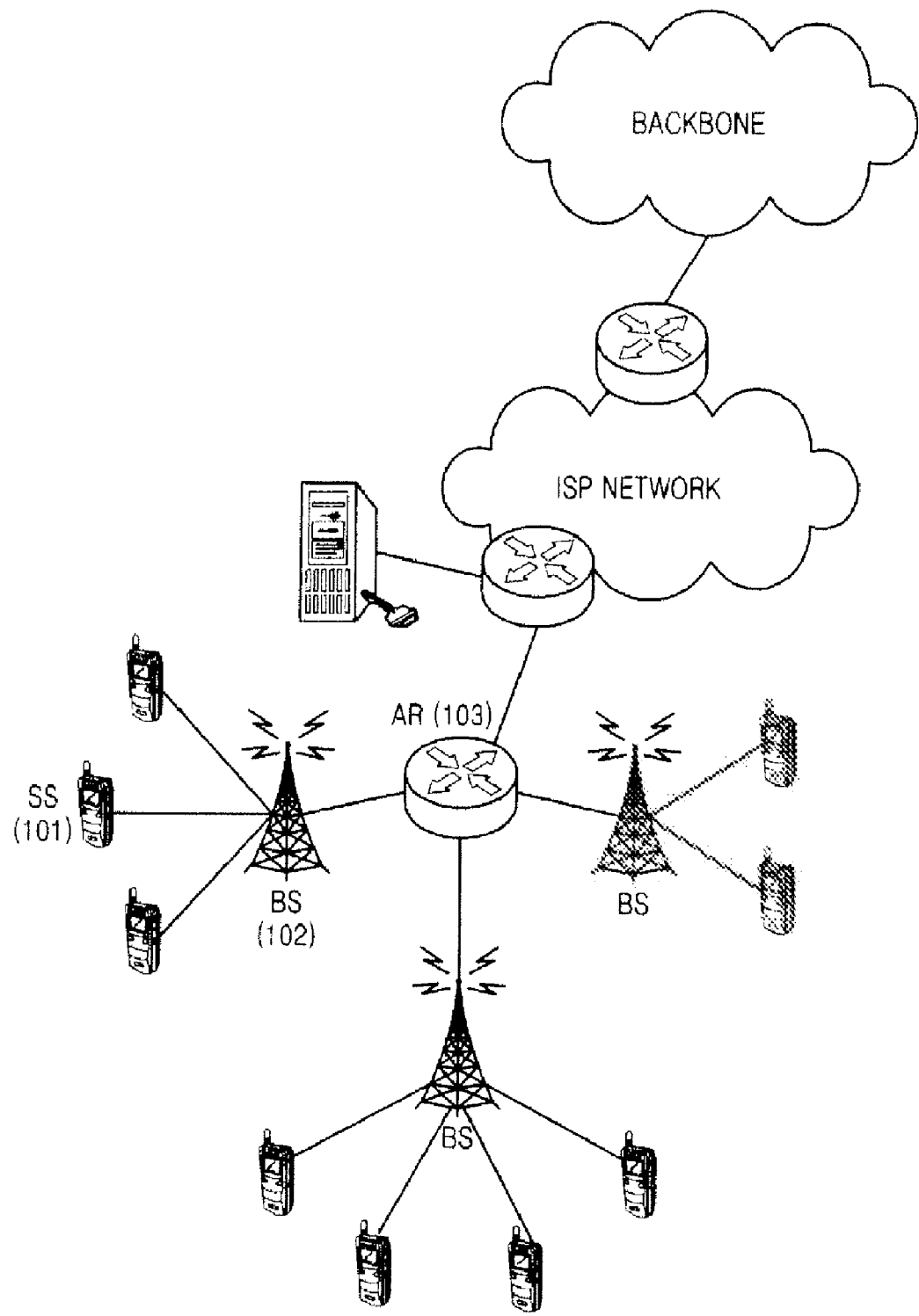
FIG. 1 illustrates a structure of a conventional IEEE 802.16/WiBro network.
Figure 2:
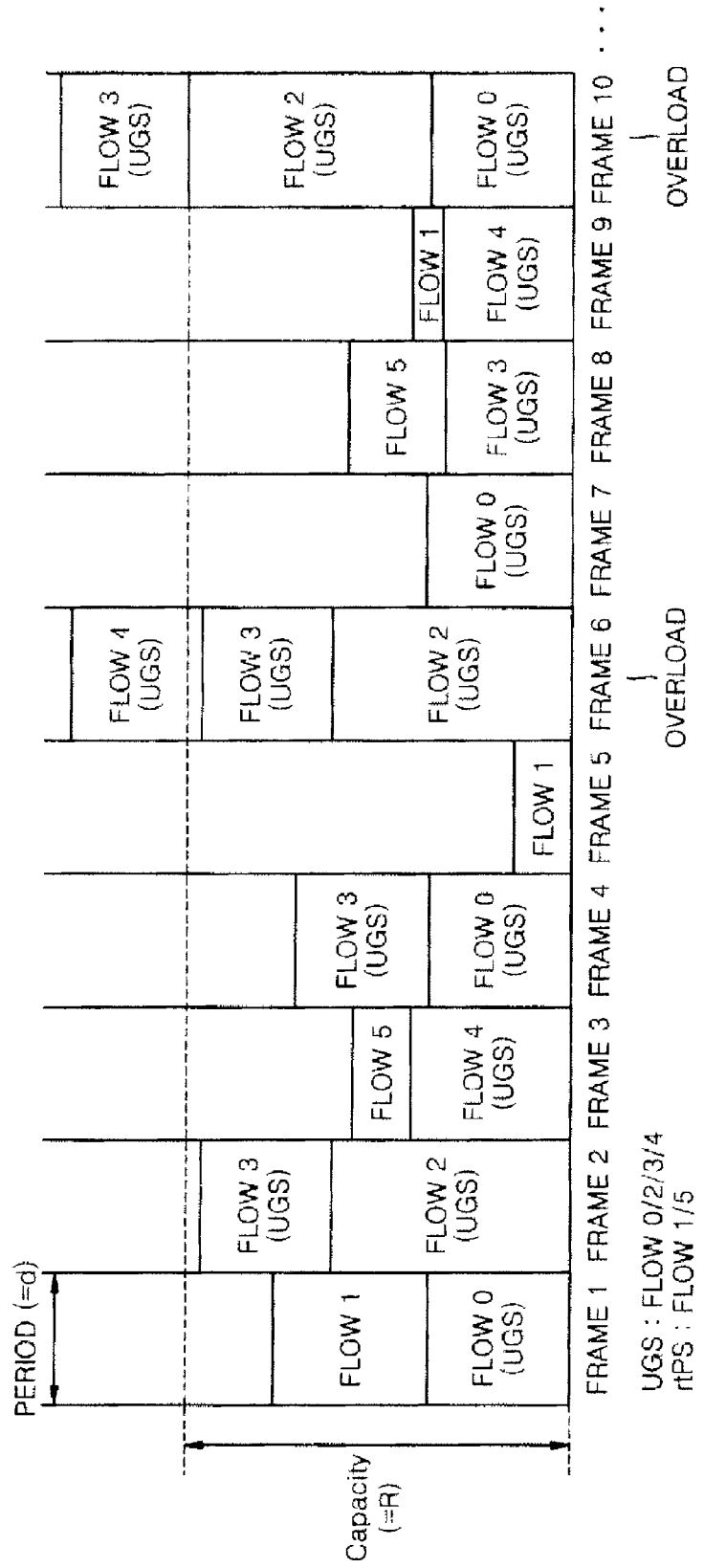
FIG. 2 is a diagram for explaining an overload exceeding service capacity of a conventional base station (BS)

The attached drawings for illustrating exemplary embodiments of the present invention are referred to in order to gain a sufficient understanding of the present invention, the merits thereof, and the objectives accomplished by the implementation of the present invention.

The present invention will now be described more fully with reference to the accompanying drawings, in which exemplary embodiments of the invention are shown. Like reference numerals in the drawings denote like elements, and thus their description will be omitted.

The present invention relates to an unsolicited grant service (UGS) class. The 802.16 system initializes a UGS service by communicating a message such as DSA-REQ/DSA-RSP between a subscriber station (SS) and a base station (BS). An initialization process is well known to one of ordinary skill in the art and thus a description thereof will not be provided here. The present invention concerns UGS parameters applied by the BS to the SS. The UGS parameters include a grant interval, a guaranteed size, etc. The present invention mainly concerns the grant interval.

Figure 3:
FIG. 3 is a table of information on grant intervals and guaranteed sizes of flows according to an embodiment of the present invention.

FIG. 3 is a table of information on grant intervals and guaranteed sizes of flows according to an embodiment of the present invention. Referring to FIG. 3, the UGS scheduling method is performed under the assumption that an SS 101 requires 1 through M (where M is a positive integer) UGS flows, and a BS 102 serves 1 through N (where N is a positive integer) frames.

The BS 102 stores grant periods and guaranteed sizes that are granted to the M UGS flows in the N frames.

A UGS flow related matrix includes the N frames at a vertical axis, and the UGS flows at a horizontal axis. For example, the UGS flow 1 has a grant period of 2 and a guaranteed size of 50 [Kilo-bit]. Since the grant period of the flow 1 is 2, the flow 1 receives a service in even frames 2, 4, 6, through to N.

The BS 102 compares a service capacity of a frame and a sum of guaranteed sizes of flows belonging to the N frames and determines if an overload occurs. For example, if the service capacity is 200 [Kilo-bit], since the sum of guaranteed sizes of the flows in the frame 6 is 230, the overload occurs in the frame 6. The overload also occurs in the frame 12.

Figure 4:
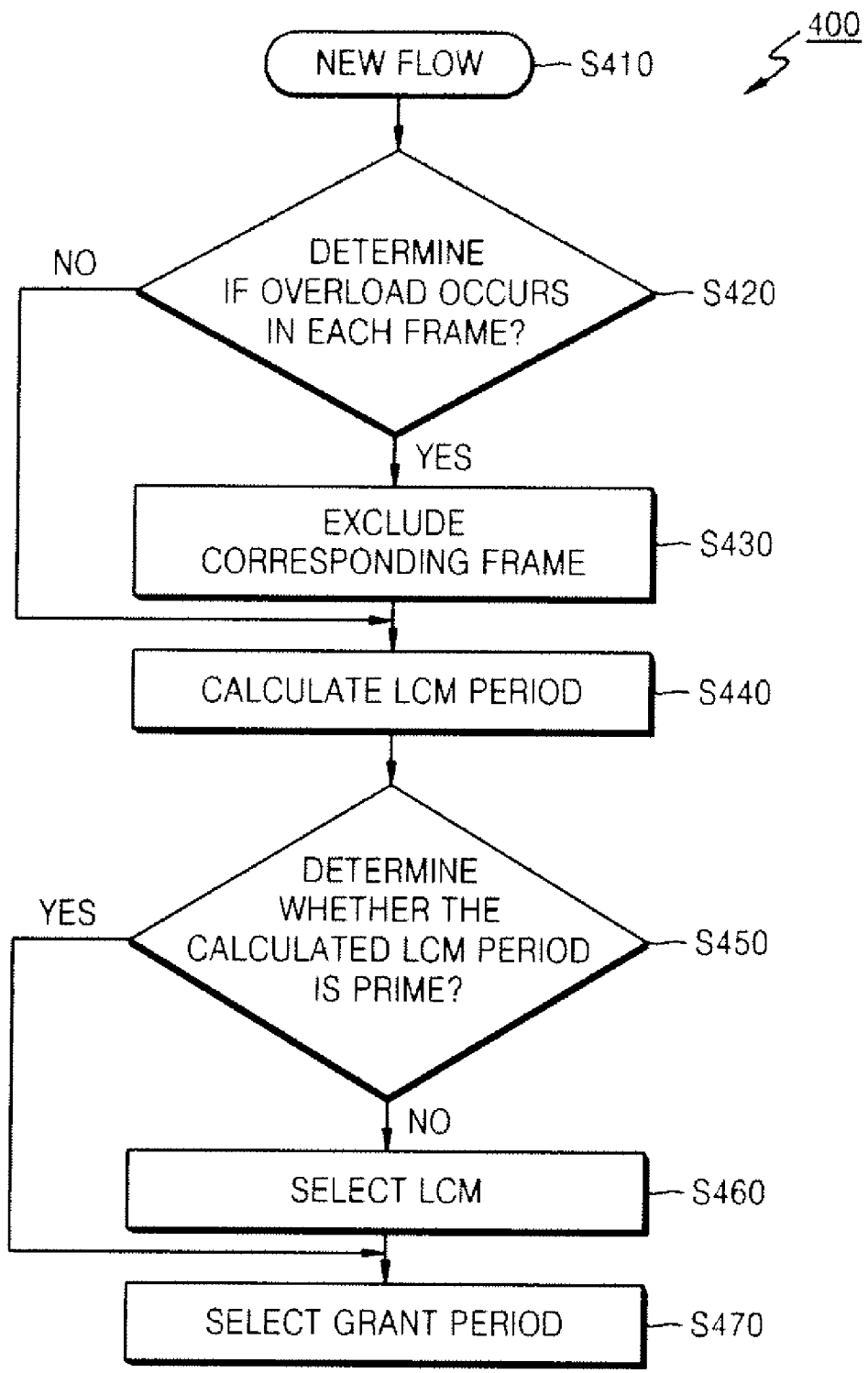
FIG. 4 is a flowchart illustrating an unsolicited grant service (UGS) scheduling method according to an embodiment of the present invention.

FIG. 4 is a flowchart illustrating a UGS scheduling method according to an embodiment of the present invention. Referring to FIG. 4, a pseudo code is described in Table 1 below.

TABLE 1

```
// When new flow i sends DSA-REQ to BS, BS performs
below ...........(410S)
For each column of the Matrix_ugs, // f means the each frame from 1 to N
if {Matrix_ugs[M,f] > F /1024 + δ )} //δ (kbits) :
boundary value ..(420S)
    Remove the frame from the candidate frames         .......(430S)
    Update total number of N
For(f=1, f < N; f++) //Assume the flow i services starts at frame f
    Calculate the LCM with flow i and other flows at frame f .........(440S)
    If the result of LCM is relatively prime,        .........(450S)
        Send DSA-RSP including α value as grant interval
        exit
Choose the grant interval to the smallest result of LCM        ..........(460S)
Send DSA-RSP including selected grant interval
```

The definition of parameters included in Table 1 is as follows.

BS information
Maximum service capacity per frame: F (bits)
Matrix relating to serving UGS flows: Matrix_ugs
M: number of all flows being served (see FIG. 3)
N: number of all frames (see FIG. 3)
Information on a new flow i
Grant Interval: α (msec)
Guaranteed Size: β (bits)

Referring to FIGS. 3, 4, and Table 1, the UGS scheduling method of the present embodiment will now be described.

If the SS 101 transmits a DSA-REQ message including a new flow to the BS 102 (operation 410), the BS 102 starts a process for granting a grant period and guaranteed size to the new flow.

The BS 102 determines if an overload occurs in a frame (operation 420), and excludes the frame in which the overload occurs from a candidate group of service frames (operation 430). For example, the frames 6 and 12 shown in FIG. 3 are excluded from the candidate group of service frames since the overload occurs in the frames 6 and 12. A frame may be used tightly or loosely (define what this means in context of invention) according to a parameter δ included in a corresponding code "if{Matrix_ugs[M,f]>F/1024+δ}}," of Table 1, corresponding to operation 420S. In more detail, if a value of parameter δ is small, the frame is tightly used, and, if the value of parameter δ is great, the frame is loosely used.

The BS 102 calculates a least common multiple (LCM) period between a new flow and other flows belonging to a frame at the time the DSA-REQ message arrives at the BS 102 with regard to frames that are not excluded in operation 430 (operation 440), so that the calculated LCM period does not overlap with a grant period granted to the new flow.

It is determined whether the calculated LCM period is a prime (operation 450). If the calculated LCM period is a prime, the calculated LCM period is selected as a grant period of the new flow (operation 470).

If the calculated LCM period is not a prime, a value for minimizing the LCM is determined (operation 460), and the value is selected as the grant period of the new flow (operation 470).

The BS 102 transmits the selected grant period of the new flow to the SS 101 via the DSA-RSP message.

When a new UGS flow makes a DSA-REQ request from the SS 101, the BS 102 accepts a service based on the matrix information shown in FIG. 3, and starts the new UGS flow at the time an occurrence of the LCM period is minimized.

Figure 5A:
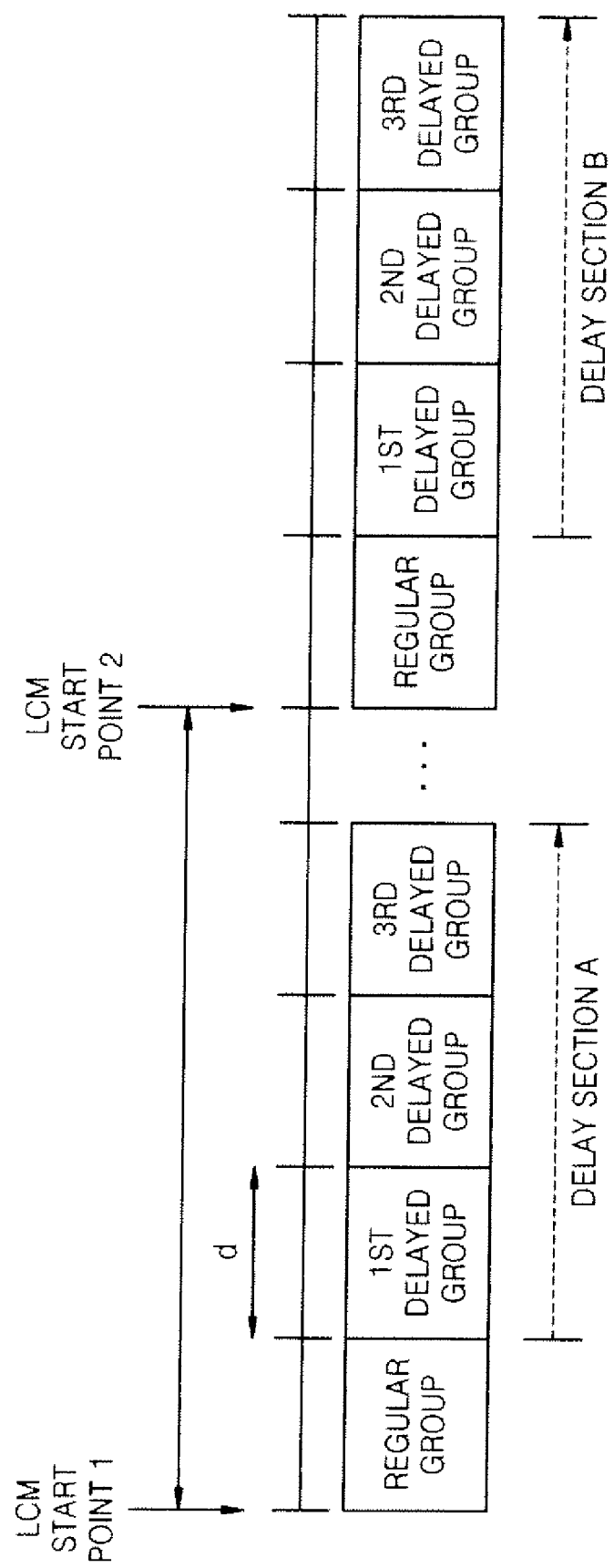
FIG. 5A is a diagram of flow groups where a service is delayed at regular intervals when an overload occurs.

FIG. 5A is a diagram of flow groups where a service is delayed at regular intervals when an overload occurs. Referring to FIG. 5A, even if flows belong to a UGS class, the service is repeatedly delayed in the flows at a regular interval. Under these circumstances, UGS flows are divided into groups as described below.

1. Regular group: Flows of this group are served without any influence of a service interval of other flows but at regular grant intervals.

2. L-delay group (where L is a positive integral): Flows of this group are served under the influence of a service interval of other flows but are not served in a frame of a given service interval due to a limited capacity of a frame. For example, first through third delayed groups are illustrated in FIG. 3.

Such groupings can be made since all UGS flows have a regular grant period, and all UGS flows belong to a group, so that the same service delay occurs in each group.

In more detail, even if grant periods of flows that start a service first overlap, the service is provided at a regular interval, whereas other flows miss a served frame.

Flows belonging to the third delayed group after a first LCM start point 1 (delay section A) continuously belong to the third delayed group after a second LCM start point 2 (delay section B) and thus a service delay continues. Unfairness occurs in the flows belonging to the first through third delayed groups at an LCM period k.

Figure 5B:
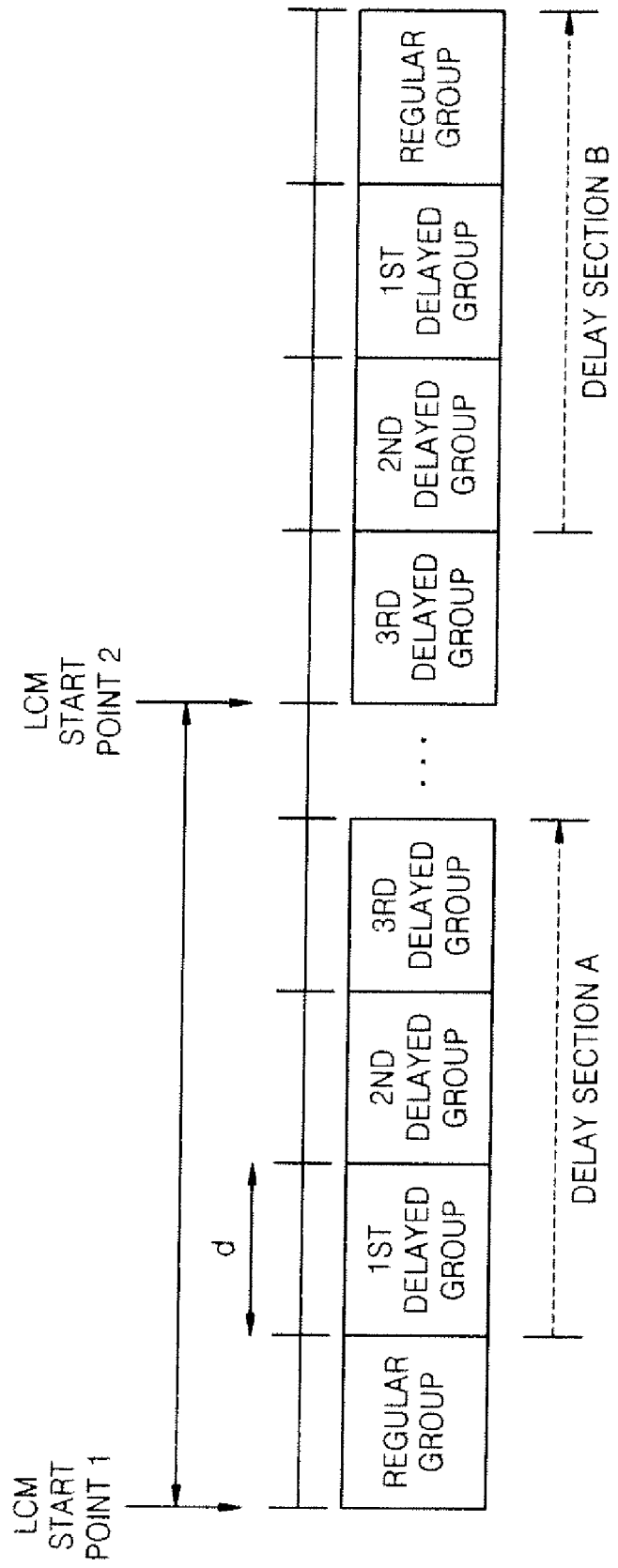
FIG. 5B is a diagram of a different group priority of each overload frame for resolving a problem shown in FIG. 5A.

FIG. 5B is a diagram of a different group priority of each overload frame for resolving the problem shown in FIG. 5A. Referring to FIG. 5B, the number of service delays that occur in overload frames is reduced, that is, a flow group problem whereby a service delay occurs at regular intervals, as shown in FIG. 5A, is resolved.

The UGS scheduling method of the present invention calculates parameters indicating the degree of a service delay, i.e., weights of delay (WD)_0 through WD_L, with regard to a regular group and an L-delay group.

The parameters WD_0 through WD_L are calculated by using a period d of a frame. For example, since a regular group has no service delay, the parameter WD_0 is 0*d, i.e., 0. The parameter WD_3 of the third delayed group is 3*d.

Such delay parameters are a reference for determining which flows belonging to a corresponding group have a service delay.

The UGS scheduling method of the present invention updates the parameters WD_0 through WD_L each frame corresponding to an LCM period, and changes a service order.

The parameters WD_0 through WD_L are updated every LCM period, i.e., between the first LCM start point 1 and the second LCM start point 2. In this regard, a group having the greatest WD is first served at a next LCM period so as to change the service order, so that the unfairness does not occur.

Referring to FIG. 5B, flows belonging to the third delayed group after the first LCM start point 1 (delay section A) are first served after the second LCM start point 2, so that unfairness does not occur. Such a change in the service order resolves the unfairness between flows belonging to a class, thereby preventing a service delay that continuously increases on a regular basis.

The UGS scheduling system realized in the IEEE 802.16/WiBro system according to an embodiment of the present invention comprises an SS disposed in a network where the IEEE 802.16/WiBro system is realized and a BS in the network where the IEEE 802.16/WiBro system is realized, and an overload determining unit (not shown), when the SS requires 1 through M (where M is a positive integer) UGS flows, and the BS serves 1 through N (where N is a positive integer) frames, that stores grant periods and guaranteed size that are granted to the M UGS flows in each N frame, compares service capacity of a frame and a sum of guaranteed size of each flow belonging to the N frames, and determines if an overload occurs.

The BS further comprises a period calculating unit (not shown) that, if a new flow of the SS transmits a DSA-REQ message to the BS, excludes a frame where the overload occurs from a group of service frames, and calculates an LCM period between the new flow and other flows belonging to a frame at the time the DSA-REQ message arrives at the BS with regard to frames that are not excluded.

The BS further comprises a period selecting unit that, if the calculated LCM period is a prime, selects the calculated LCM period as a grant period of the new flow, and, if the calculated LCM period is not a prime, selects a value for minimizing the LCM as the grant period of the new flow.

The UGS scheduling system realized in the IEEE 802.16/WiBro system according to another embodiment of the present invention comprises an SS disposed in a network where the IEEE 802.16/WiBro system is realized and a BS in the network where the IEEE 802.16/WiBro system is realized, and a group dividing unit that, when an overload occurs, divides flows belonging to a corresponding frame into a regular group that is not served under an influence of a service interval of other flows but is served at a regular grant interval and an L-delay group (where L is a positive integral) that is served due to a delay of an L frame.

The BS further comprises a delay calculating unit that calculates parameters WD_0 through WD_L indicating the degree of a service delay with regard to the regular group and the L-delay group, and a service order changing unit that updates the parameters WD_0 through WD_L of each frame corresponding to an LCM period and changes a service order.

The UGS scheduling method and system of the IEEE 802.16/WiBro system according to the present invention provide a service based on grant intervals of UGS flows so that an UGS overload is resolved, thereby providing a proper QoS.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An unsolicited grant service (UGS) scheduling method with regard to a subscriber station (SS) and a base station (BS) that are disposed in a network in which an IEEE 802.16/Wibro system is realized, the method comprising:

when the SS requires 1 through M (wherein M is a positive integer) UGS flows, and the BS serves 1 through N (wherein N is a positive integer) frames, the BS storing grant periods and guaranteed sizes that are granted to the M UGS flows in each N frame;

the BS comparing service capacity of a frame and a sum of guaranteed sizes of each flow belonging to the N frames, and determining if an overload has occurred;

after the comparing, a new flow of the SS transmitting a DSA-REQ message to the BS;

after the comparing, excluding a frame in which the overload has occurred from a group of service frames; and calculating a least common multiple (LCM) period between the new flow of the SS and other flows belonging to a frame at a time the DSA-REQ message arrives at the BS, with regard to frames that are not excluded.

2. The method of claim 1, further comprising: if the calculated LCM period is a prime, selecting the calculated LCM period as a grant period of the new flow.

3. The method of claim 1, further comprising: if the calculated LCM period is not a prime, selecting a value for minimizing the LCM as the grant period of the new flow.

4. The method of claim 2, further comprising: the BS transmitting the selected grant period to the SS via a DSA-RSP message.

5. An unsolicited grant service (UGS) scheduling method with regard to a subscriber station (SS) and a base station (BS) that are disposed in a network in which an IEEE 802.16/Wibro system is realized, the method comprising:

when the SS requires 1 through M (wherein M is a positive integer) UGS flows, and the BS serves 1 through N (wherein N is a positive integer) frames, the BS storing grant periods and guaranteed sizes that are granted to the M UGS flows in each N frame;

the BS comparing service capacity of a frame and a sum of guaranteed sizes of each flow belonging to the N frames, and determining if an overload has occurred; when the overload occurs, dividing flows belonging to a corresponding frame into a regular group that is served without any influence of a service interval of other flows but is served at a regular grant interval and an L-delay group (where L is a positive integral) that is served due to a delay of an L frame.

6. The method of claim 5, further comprising: after the dividing of flows, calculating parameters comprising weights of delay (WD) that indicate the degree of a service delay with regard to the regular group and the L-delay group.

7. The method of claim 6, further comprising: after the calculating of the parameters WD, calculating an LCM period of flows belonging to the frame where the overload occurs, updating the parameters WD for each frame corresponding to the LCM period, and changing a service order.

8. A UGS scheduling system realized in an IEEE 802.16/WiBro system comprising:

an SS located in a network in which the IEEE 802.16/WiBro system is realized;

a BS located in the network in which the IEEE 802.16/WiBro system is realized; and wherein the BS comprises an overload determining unit, when the SS requires 1 through M (wherein M is a positive integer) UGS flows, and the BS serves 1 through N (wherein N is a positive integer) frames, storing grant periods and guaranteed size that are granted to the M UGS flows in each N frame, and comparing service capacity of a frame and a sum of guaranteed sizes of each flow belonging to the N frames, and determining if an overload has occurred; and, wherein the BS comprises a period calculating unit, if a new flow of the SS transmits a DSA-REQ message to the BS, excluding a frame where the overload occurs from a group of service frames, and calculating an LCM period between the new flow of the SS and other flows belonging to a frame at a time the DSA-REQ message arrives at the BS, with regard to frames that are not excluded.

9. The system of claim 8, wherein the BS comprises a period selecting unit, if the calculated LCM period is a prime, selecting the calculated LCM period as a grant period of the new flow, and if the calculated LCM period is not a prime, selecting a value for minimizing the LCM.

10. The system of claim 8, wherein the BS comprises a group dividing unit, when the overload occurs, dividing flows belonging to a corresponding frame into a regular group that is served without any influence of a service interval of other flows but is served at a regular grant interval and an L-delay group (where L is a positive integral) that is served due to a delay of an L frame.

11. The system of claim 10, wherein the BS comprises:
a delay calculating unit calculating parameters WD that indicate the degree of a service delay with regard to the regular group and the L-delay group; and
a service order changing unit calculating an LCM period of flows belonging to the frame where the overload occurs, updating the parameters WD for each frame corresponding to the LCM period, and changing a service order.

* * * * *